(12) United States Patent
Pacinelli

(10) Patent No.: US 6,679,219 B1
(45) Date of Patent: Jan. 20, 2004

(54) INTAKE AND EXHAUST VALVES FOR INTERNAL COMBUSTION ENGINES

(76) Inventor: Louis A. Pacinelli, 200 Hewett Rd., Wyncote, PA (US) 19095

( * ) Notice: Subject to any disclaimer, the term of this patent is extended or adjusted under 35 U.S.C. 154(b) by 0 days.

(21) Appl. No.: 10/302,195

(22) Filed: Nov. 22, 2002

Related U.S. Application Data

(60) Division of application No. 10/010,938, filed on Nov. 13, 2001, and a continuation of application No. 09/511,703, filed on Feb. 23, 2000, now abandoned.

(51) Int. Cl.[7] ................................................. F01L 3/20
(52) U.S. Cl. ............................... 123/188.3; 123/188.8; 123/188.9; 123/90.5
(58) Field of Search .............................. 123/90.5, 188.1, 123/188.2, 188.4, 188.14, 188.3, 188.6, 188.8, 188.9

(56) References Cited

U.S. PATENT DOCUMENTS

| | | |
|---|---|---|
| 2,622,574 A | 12/1952 | Butterworth |
| 2,799,266 A | 7/1957 | Kinman |
| 3,090,370 A | 5/1963 | Kimball |
| 3,878,825 A | 4/1975 | Klomp |
| 4,036,185 A | 7/1977 | Key |
| 4,309,969 A | 1/1982 | Matthes |
| 4,739,968 A * | 4/1988 | Schabinger ............... 251/304 |
| 4,779,584 A | 10/1988 | Mosler |
| 4,790,272 A | 12/1988 | Woolenweber |
| 4,981,118 A | 1/1991 | Lefebvre |
| 5,081,965 A | 1/1992 | Walters et al. |
| 5,168,843 A | 12/1992 | Franks |
| 5,606,957 A | 3/1997 | Feucht |
| 5,740,771 A * | 4/1998 | Sebastian ............... 123/188.4 |

* cited by examiner

Primary Examiner—Tony M. Argenbright
Assistant Examiner—Hai Huynh
(74) Attorney, Agent, or Firm—Caesar, Rivise, Bernstein, Cohen & Pokotilow, Ltd.

(57) ABSTRACT

An intake and exhaust valve for an internal combustion engine is provided wherein the stem longitudinal axis is offset from the valve head center. Alternatively, the valve head may have an end having a planar surface wherein the axis and the surface are not perpendicular. Alternatively, the valve head may have an irregular perimeter having a straight edge, and another edge being rounded and generally radiused to the straight edge. Alternatively, the valve head may have a stepped, non-planar shape with respect to the plane of the face of the head. Alternatively, the valve head may have a shape that is pie-shaped. Alternatively, the stem longitudinal axis may be offset from the center point of the valve head, and the valve head may have an end having a planar surface, wherein the longitudinal axis and the planar surface are not perpendicular to one another.

2 Claims, 6 Drawing Sheets

INTAKE AND EXHAUST VALVES FOR INTERNAL COMBUSTION ENGINES

CROSS-REFERENCES TO RELATED APPLICATIONS

This is a Divisional application of U.S. application Ser. No. 10/010.938, entitled Intake and Exhaust Valves for Internal Combustion Engines, filed on Nov. 13, 2001, now pending, which is a Continuation application of U.S. application Ser. No. 09/511,703, entitled Intake and Exhaust Valves for Internal Combustion Engines, filed on Feb. 23, 2000.

BACKGROUND OF THE INVENTION

The present invention relates to the field of reciprocating internal combustion engines. More specifically, the invention relates to intake and exhaust valves and their relationship to the angle, position and shape of the valve head. The intake valve cooperates with the intake port of an induction system of the engine whereby it is operative to control the direction of the admission of an induction charge into the combustion chamber of the engine so as to create a highly efficient flow of the production charge into and within the combustion chamber. This allows for a more efficient and straight intake port and more efficient combustion chamber. The exhaust valve cooperates with the exhaust port of an exhaust system associated with the engine to control the exit of exhaust gases from the combustion chamber into the exhaust system so as to create a more efficient exhaust port and more efficient combustion chamber.

In the field of internal combustion engines, many improvements to intake and exhaust valves have been made. For example, U.S. Pat. No. 4,779,584, to Warren Mosiler discloses an intake valve having an aerodynamic design in the flow path subsequent to the valve seat portion of the valve. Others have provided fins or ribs on the upstream side of the valve head, such as that shown in U.S. Pat. No. 3,090,370, to H. W. Kimball and U.S. Pat. No. 4,309,969, to William R. Matthes, to increase the turbulence of the intake charge and swirl and to increase combustion and port flow efficiency. But the fins and ribs are cumbersome, complex to manufacture, and restrict air flow efficiency into the combustion chamber. Additionally, the fins or ribs do not address the necessity for a substantial bend in the intake and exhaust ports to allow room for valve stem guides, valve spring seats, and related parts. In U.S. Pat. No. 5,081,965, to Craig E. Walters et al., the invention has a region of the upper head portion with runout, but both the head region and the stem region have a common axis. Here, the valve stem is straight and located in the center of the valve head. The centerline of the valve stem is perpendicular to the face of the valve head, and the valve head is round or cylinder-shaped when looking down the valve stem centerline toward the valve head. In actual practice, this design limits the design of the intake and exhaust ports, the location of the valve springs and other valve activating mechanisms such a rocker arms, push rods and camshafts. The valve actuating mechanisms are more compact and of a more simple design if the valve stems are in a straight line and/or parallel to each other instead of angled in different directions. This is not an ideal arrangement for the combustion chamber. This is also not an ideal arrangement for the location and shape of the intake and exhaust ports and valves within the combustion chamber. Also, intake ports often have to be shaped with bends to go around pushrods coming from the camshaft to the rocker arms. This is an important limitation of the prior art since compactness of valve actuating mechanism is desired. Thus, it is often the case that intake and exhaust ports are designed with relatively sharp angular bends connecting a throat portion near the valve seat with an exit or entrance portion extending laterally out through the side wall of the port defining cylinder head or engine block.

It would be desirable to provide an improved intake and exhaust valve which significantly reduces the resistance in the flow of the intake charge and increases the efficiency and effective flow of the intake charge into and within the combustion chamber. It would also be desirable to improve the shape of intake port, combustion chamber and corresponding valve seat, thereby improving the efficiency of the combustion process. Also, it would be desirable to provide an exhaust valve that significantly reduces the resistance of the exhaust flow out of the cylinder and engine thereby improving the efficiency of the combustion process.

In a hemispherical type combustion chamber, or in combustion chamber types where the faces of the valve heads are not on the same plane but at angles to each other, such as generally facing one another, the tops of the valves are spread apart at an angle, thus making the top of the cylinder head wider, larger and heavier and making the head more difficult to design the valve actuating mechanisms. It would be desirable to provide the valve faces to have angles relative to each other, but where the valve stems can be more parallel to each other than is possible with prior art valves, thus simplifying valve actuating mechanisms and allowing more compact and lighter cylinder heads and overall smaller engine size.

In a typical engine, the combustion chamber available area is round like the top of the piston and cylinder. The use of valves with round heads wastes space and is a poor usage of valuable combustion chamber volume. Therefore, it would be desirable to have a valve head shape that more effectively and efficiently uses available combustion chamber volume and that also adds swirl and turbulence to intake charge, thereby improving the quality of the intake charge into the combustion chamber.

SUMMARY OF THE INVENTION

The embodiments of the present invention allow a substantial increase in the efficiency of the airflow and shape of the intake port, valve seat and combustion chamber of an engine, to increase the overall efficiency of the engine and decrease pollution caused by the engine. By increasing the efficiency of the intake and exhaust systems, the present invention will increase engine power and torque, increase gas mileage and B.S.F.C., thereby decreasing engine pollution.

The embodiments of the present invention would work equally well on engines with multiple intake and or multiple exhaust valves per cylinder. Also, the embodiments of the present invention would work equality well on engines that use gas, diesel, alcohol, natural gas and others fuels, and either two or four stroke type engines. The embodiments of the present invention allow convenient integration with other conventional engine systems, such as ignition systems, cylinder heads, carburetor and fuel injection systems, exhaust and intake systems, and pollution control systems.

The present invention is directed to an intake and exhaust valve and valve guide for an internal combustion engine. The valve has a valve head for mating with a valve seat and the valve has a stem having a stem end and a head end. The stem is sized to slidably move in the valve guide within the engine and the head for being moved between open and closed positions as the stem is moved in the guide.

In one preferred embodiment, the valve head has a center point, and the valve stem longitudinal axis is substantially offset from the center point of the valve head. Preferably, the valve head is attached to the valve stem at a point from between about 20 percent to about 30 percent of the diameter of the valve head, as measured from a perimeter of the valve head.

In another preferred embodiment, the valve has a valve stem having a longitudinal axis and the valve head has an end having a generally planar surface. Here, the longitudinal axis and the planar surface are at an angle other than perpendicular to one another. Preferably, the planar surface is oriented at approximately 24 degrees to 30 degrees from the longitudinal axis.

In another preferred embodiment, the valve head has an irregular perimeter. The perimeter has a generally straight edge, radiused corners adjacent the straight edge, and another edge being rounded and generally smoothly radiused to the straight edge.

In another preferred embodiment, the valve head has a stepped, non-planar shape with respect to the plane of the face of the valve head.

In another preferred embodiment, the valve head has a shape that is generally pie-shaped having radiused corners. Preferably, the pie-shape is approximately a one-fourth section of a pie.

Finally, in another preferred embodiment, the valve stem longitudinal axis is substantially offset from the center point of the valve head, and the valve head has an end having a generally planar surface, wherein the longitudinal axis and the planar surface are at an angle other than perpendicular to one another.

In all the preferred embodiments, an anti-rotation mechanism to prevent rotation of the valve may be included.

BRIEF DESCRIPTION OF THE DRAWINGS

The invention will be described in conjunction with the following drawings in which like reference numerals designate like elements throughout the several views and wherein.

DESCRIPTION OF THE PREFERRED EMBODIMENTS

Figure 1:
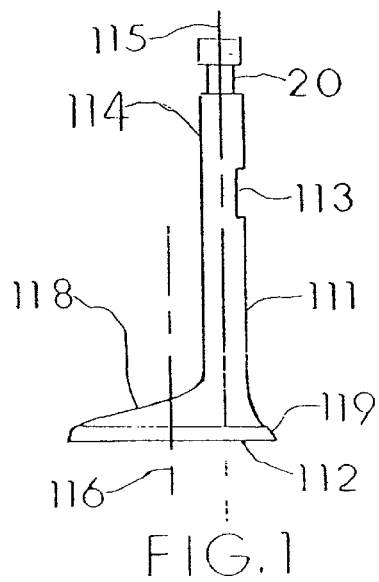
FIG. 1 is a side view elevational view of an intake and exhaust valve provided with a valve stem that is offset relative to the valve head, in accordance with one preferred embodiment of the present invention.
Figure 2:
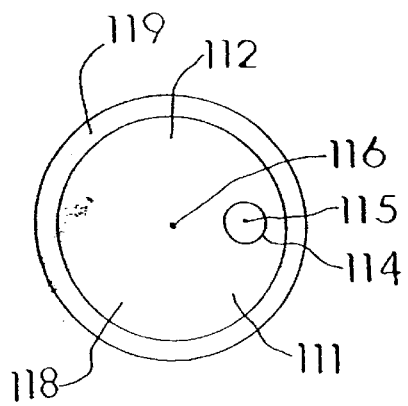
FIG. 2 is a top, plan view of the valve of FIG. 1.

Referring now to the figures wherein like reference numbers refer to like elements throughout the several views, there is shown in FIG. 1 an improved intake and exhaust valve 111 in accordance one preferred embodiment of the present invention. The intake and exhaust valve 111 has a valve head 112 and a valve stem 114, and the valve stem has a centerline or longitudinal axis 115 that is offset from the center point or axis 116 of the valve head 112. The valve 111 is designed such that a corresponding valve guide (not shown) is not required to be located on a line coaxial with the center point of the valve seat and center point 116 of the valve head 112. This allows the valve ports (also not shown) to be shifted somewhat independently of the valve stem 114 location and the location of any valve actuating mechanisms. This is not possible in prior art valve designs, for example, the prior art valves shown in FIGS. 3, 4 and 12. FIG. 1 also shows a machine groove 20 for a valve spring retainer mechanism. The valve seat surface 119 on valve head 112 is machined to correspond with its corresponding valve seat. Cut out 113 in valve stem 114 depicts a portion of an anti-rotation mechanism that will be described in further detail below. FIG. 2 depicts a top plan view of the intake and exhaust valve 111 of FIG. 1. This view shows a view looking from top of valve stem 114 towards the back of the valve head 118. The offset allows an increased flow of intake and exhaust gases passed the valves and through the ports and combustion chamber, and also allows for more convenient and efficient locations of valves within the engine or combustion chamber. This design also allows for more efficient port shapes and locations and improved location of valve actuating mechanisms such as valve springs, valve rocker arms, pushrods, camshafts, intake and exhaust manifolds, and other mechanisms where improved placement of valve heads or valve stems would be beneficial. The amount of offset both valves fabricated in accordance with the present invention is intended to be modified in accordance with a particular engine design.

Figure 3:
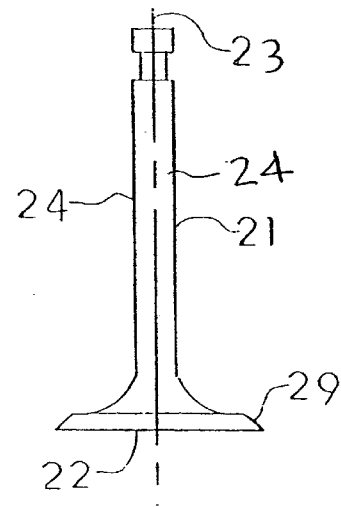
FIG. 3 is a side elevational view of a prior art intake and exhaust valve.

Referring now to FIG. 3, there is shown a prior art valve 21 having a straight valve stem 24 and a valve head 22. The valve stem 24 and valve head 22 are formed as a body of revolution around a longitudinal axis 23, with the upstanding valve stem 24 concentric to the axis of the valve head 22.

FIG. 2 also shows the valve stem centerline or longitudinal axis 23, which is also located at the center point of the valve head 22. A valve seat surface 29 is also shown.

Figure 4:
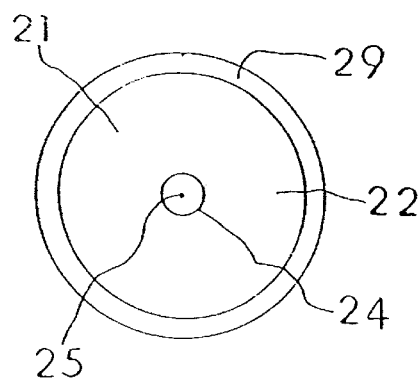
FIG. 4 is a top, plan view of the of the intake and exhaust valve of FIG. 3.

FIG. 4 shows a top, plan view of the intake and exhaust valve 21 according to prior art valve of FIG. 2. The illustration is of a view looking down from top of valve stem 24 toward back of valve head 22 also showing valve seat 29 and center point 25 of valve head 22 and longitudinal axis 23 of valve stem 24.

Figure 6:
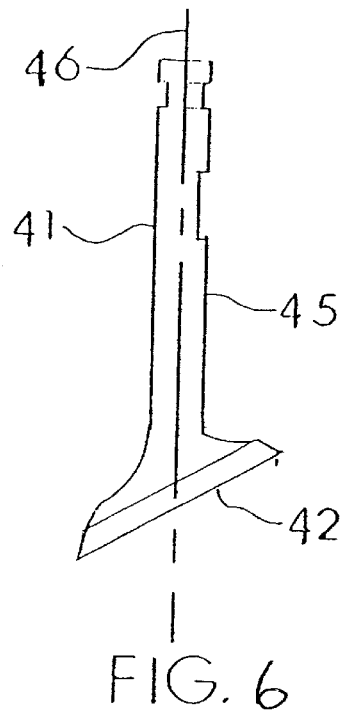
FIG. 6 is a side elevational view of an intake and exhaust valve where the valve head has a substantially angled face relative to the longitudinal axis of the valve stem, in accordance with another embodiment of the present invention.

Referring to FIG. 6, there is shown an alternate embodiment of the intake and exhaust valve of the present invention wherein a side view of a valve 41 having a valve head 42 is shown. The valve head 42 is joined to the valve stem 45 at an angle to the longitudinal axis 46 of the valve stem 45. That is, the plane of the valve head 42 is not perpendicular to the longitudinal axis 46 of the valve head 42. The valve head 42 may be tilted in a compound angle off the longitudinal axis 46 of the valve stem 45. This allows the tilting of the valve head 42 without tilting the attached valve stem 45.

Figure 5:
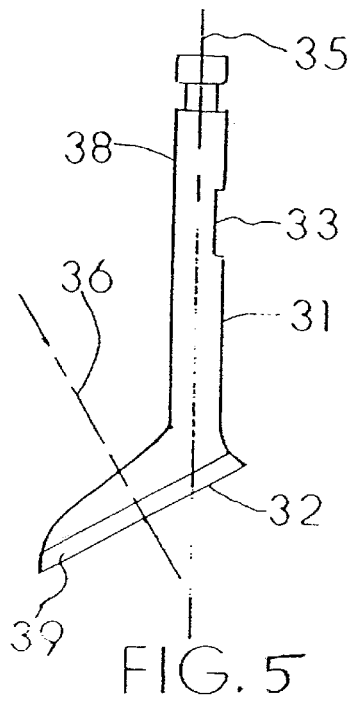
FIG. 5 is a side elevational view of an intake and exhaust valve where the valve is provided with a valve head that is offset and angled relative to the longitudinal axis of the valve stem, in accordance with another embodiment preferred embodiment of the present invention.

FIG. 5 shows another alternate embodiment of an intake and exhaust valve 31 of the present invention. Here, an offset valve head 32, with corresponding valve seat surface 39 is shown. Here, the longitudinal axis 35 of the valve stem 38 relative to the valve head 32 is similar to the embodiment as depicted in FIG. 1. The embodiment of FIG. 5 depicts a valve head 32 angled relative to the longitudinal axis 35 of the valve stem 38 and a valve head 32 that is offset relative to the valve stem 38. This embodiment yields the combined advantages of both the embodiments of FIGS. 1 and 6. The embodiment of FIG. 5 provides for a less severe angle of a port with respect to a combustion chamber when compared to the prior art and also provides for alignment of valve stems of valves even though their respective valve heads are not in relative alignment to each other not shown. The embodiment of FIG. 5 also depicts a cutout 33 for an anti-rotation mechanism (not shown).

Figure 7:
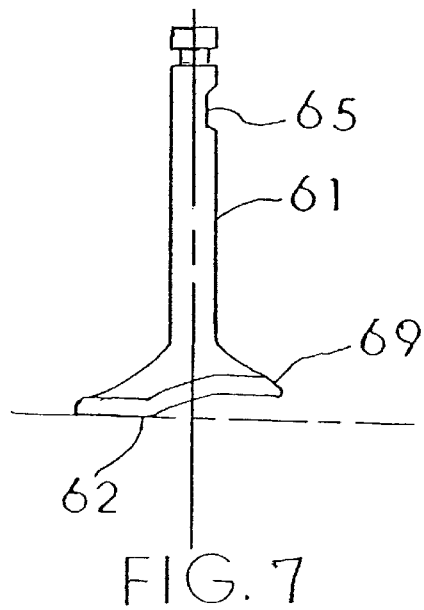
FIG. 7 is a side elevational view of an intake and exhaust valve where the valve head is provided with an irregular step shape.

FIG. 7 shows another embodiment of an intake and exhaust valve 61 with a valve head 62 that has an irregular shape. The shape of the valve head 62 (described from left to right in FIG. 7) is relatively flat, curves upwardly, then flattens out (on the right side of FIG. 7). This gives the valve head 62 a stepped shape. Also shown is a matching correspondingly shaped angular valve seat surface 69 that mates with a valve seat (not shown) in the engine or cylinder head. Again, a cutout 65 is shown for use with an anti-rotation mechanism.

Figure 8:
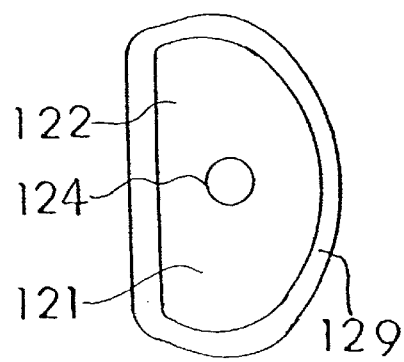
FIG. 8 is a top, plan view of an intake and exhaust valve having an irregular D-shaped valve head shape.

FIG. 8 shows a plan view of another alternate embodiment of an intake and exhaust valve 121, looking down towards the back of the valve head 122 from above the valve stem 124. The valve head 122 has an irregular shape as shown, as compared to the round or cylinder-shaped head 22 of prior art valve 21 as shown in FIG. 4. Also shown is angled valve seat 129. The valve head 122 shape is relatively flat on one side then becoming more oval or rounded towards the other side to better use available space in a combustion chamber 142 as shown, for example, in FIG. 9.

Figure 9:
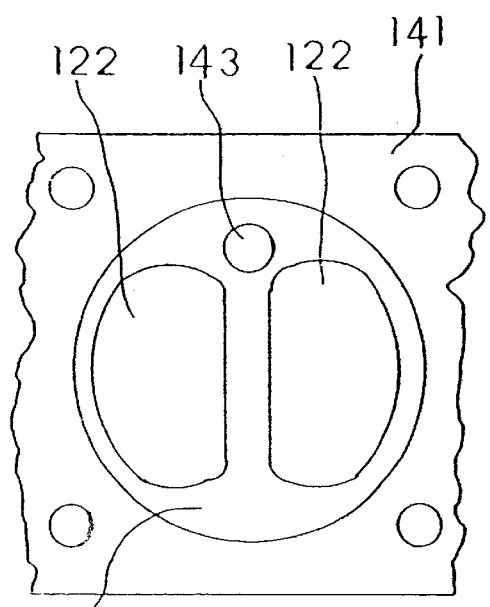
FIG. 9 is a partial, simplified view of a cylinder head showing a combustion chamber and the faces of the heads of the intake and exhaust valves in accordance with the intake and exhaust valve of FIG. 8.

FIG. 9 shows a top, plan view of a partial cylinder head 141, i.e., looking from top of a piston toward a cylinder head 141 (removed for clarity) to show the embodiment of FIG. 8 of the present invention. This figure illustrates the more efficient and effective use of valve space in a combustion chamber 142 as compared to the use of prior art valves 21 (see FIG. 10, described below) in combustion chamber 132. Hole 143 is also shown which is in the combustion chamber 142 for a spark plug or a fuel injector (for a diesel type engine). Use of the irregular shaped valve head 122 provides for a higher percentage of the available space in combustion chamber 142 that can be used for valve head surface area.

Figure 10:
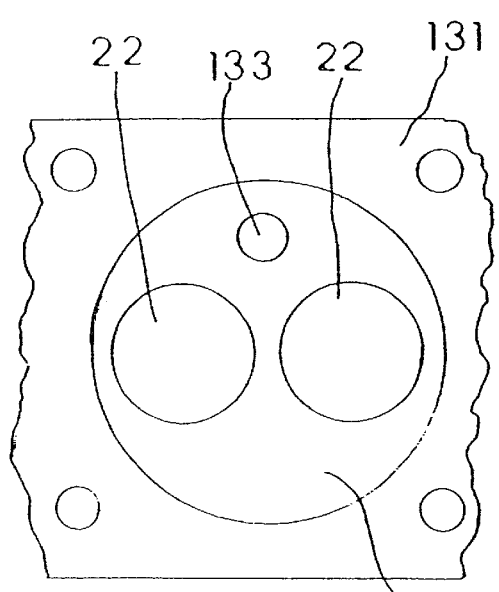
FIG. 10 is a partial, simplified view of a prior art cylinder head showing a combustion chamber and the faces of heads of the intake and exhaust valve of FIGS. 3 and 4.

FIG. 10 shows a top, plan view of prior art, partial cylinder head 131, i.e., looking from the top of a piston toward a cylinder head 131 (removed for clarity) to show the prior art valve head 22 of, for example, FIG. 4. Hole 133 is shown which is in the combustion chamber 132 for a spark plug or fuel injector (for a diesel type engine). The illustration shows a typical prior art use of space within the combustion chamber 132.

Figure 11:
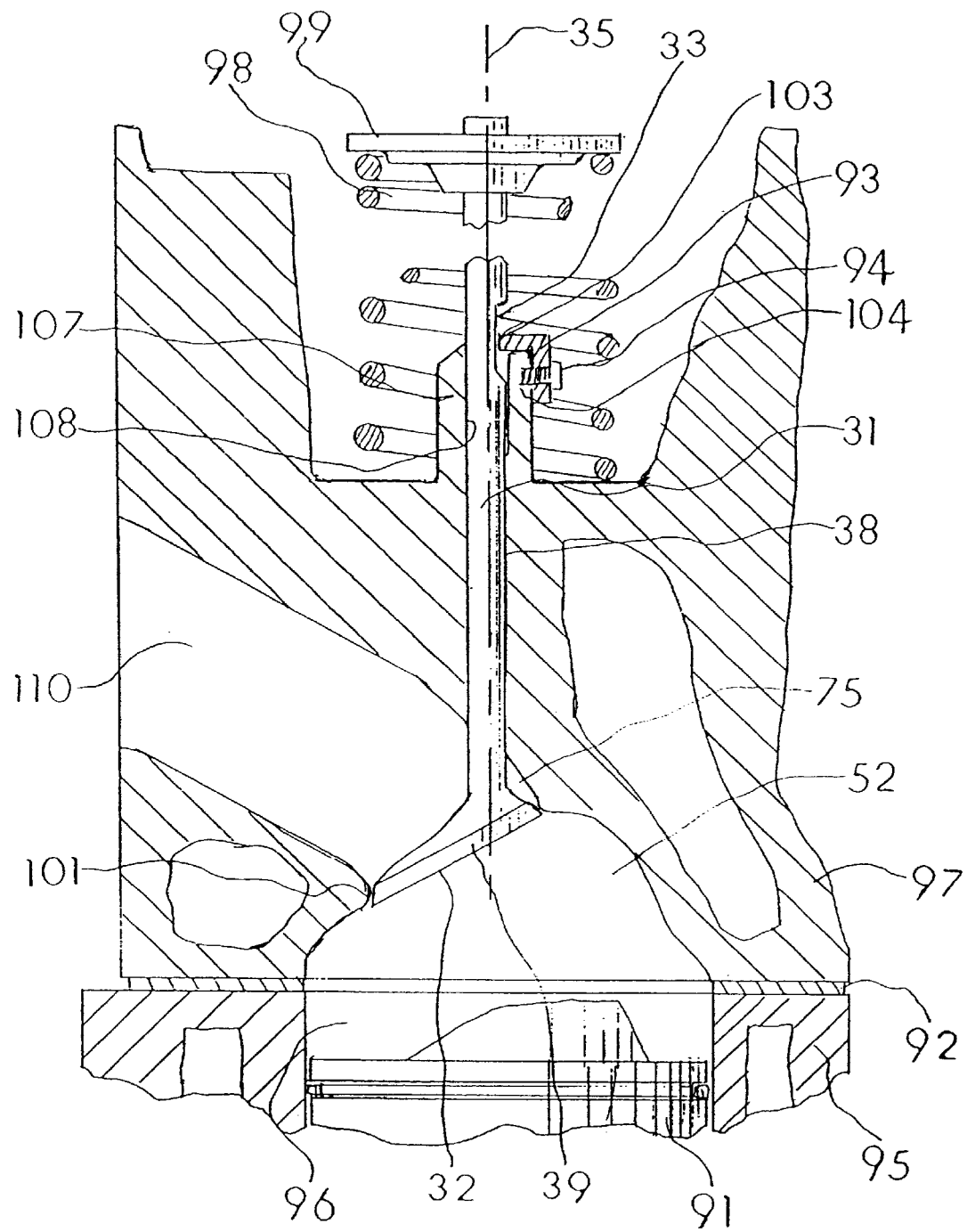
FIG. 11 is a partial, cross-sectional view of an internal combustion engine showing an angled valve head and the intake and exhaust valve of FIG. 5.

FIG. 11 is a partial, cross-sectional view of an internal combustion engine depicting a cylinder block 95 and a cylinder 96 therein and the intake and exhaust valve 31 of FIG. 5. The cylinder 96 is defined by an internal cylindrical bore wall formed in the cylinder block 95. The cylinder 96 receives a reciprocatable piston 91. The cylinder 96 is closed at one end by a cylinder head 97 that is suitably secured to the cylinder block 95 with a gasket 92 sandwiched therebetween. The cylinder 96, piston 91 and cylinder head 97 cooperate to define a variable volume combustion chamber 52. The cylinder head 97 is provided with an intake (or exhaust) port 110. At the end of the port 110 nearest the valve 31 (see FIG. 5), the port 110 terminates (or begins depending if it is an intake or exhaust port) at point 75 opening into the combustion chamber 52, with flow therefrom controlled by the valve 31. Also shown is an angled valve seat 101 machined on the cylinder head 97 that is formed to complement the valve seat surface 39 such that the cylinder head 97 is adapted for seating engagement therewith. Valve stem 38 is slidably carried in a valve guide bore 108 formed in the cylinder head 97. A suitable anti-rotation mechanism is also associated with the valve 31 and with the cylinder head 97 so as to prevent valve rotation during opening and closing movement of the valve 31 to maintain the desired orientation of the valve seat surface 39 of valve 31 with the corresponding valve seat 101 of the cylinder head 97. As an example of a suitable anti-rotation mechanism, there is provided in the construction illustrated in FIG. 11 a suitable flat or cutout 33 machined, for example, on the outer peripheral surface of the valve stem 38 adjacent the end opposite the cylinder head 97. This flat 33 mates with a suitable guide flat 103 provided on a suitably contoured bracket 93 fixed to the cylinder head 97. As shown, bracket 93 is L-shaped in cross section, with one leg of the bracket 93 having the guide flat 103 at a free end thereof, while the other leg depends down over a cylindrical valve guide boss 107 integral to the cylinder head 97 and is attached thereto, as by a machine screw 94 threaded into a suitable internally threaded aperture 104 provided for this purpose in a wall of the valve guide boss 107. It will be apparent to those skilled in the art that other suitable anti-rotation mechanism may be provided to serve the same function as those above described anti-rotation mechanism.

As can be best seen in FIG. 5, the valve head 32 is oriented at approximately 24 degrees to 30 degrees from the longitudinal axis 35 of the valve stem 38. The purpose of this orientation of the valve head is to reduce the angle of port entrance 75 (see FIG. 11) and to reduce the difference in angle between the angle of the port 110 relative to the angle of valve head 32, and to increase the efficiency and quality of the flow of intake or exhaust charge and gases. Also, the purpose of this orientation is to impart a swirl to an intake charge into combustion chamber 52 to better homogenize air and fuel.

Also shown in the embodiment of FIGS. 5 and 11, the valve head 36 is preferably attached to the valve stem 38 at a point from between about 20 percent to about 30 percent of the diameter of the valve head 36 (as measured from the outer perimeter of the valve head), thereby offsetting the valve stem 38 from the center of valve head 36. This offsetting provides for a more convenient location of valve stem 38 within the cylinder head 97 and improves the orientation of valve 31 with respect to the cylinder head 97 and related parts of the valve mechanism and engine.

In a conventional manner, the valve stem 38 of the valve 31 extends outwardly for a suitable distance from the top of the cylinder head 97 so as to permit actuation thereof in one axial direction by means of, for example, a rocker arm (not shown). Axial movement of the valve 31 in the opposite direction is affected by means of a coiled spring 98 encircling the valve stem 38. As is also conventional, one end of this coiled spring 98 abuts against the cylinder head 97 and the other end thereof engages a valve spring retainer cap 99 which is suitably secured in a known manner to the valve stem 38 adjacent to the free end thereof. Due to the improved orientation within a the cylinder head 97, the valve 31 can be positioned in a more efficient position within the combustion chamber 52 and port 110 to improve engine efficiency and to improve fuel consumption efficiency.

Figure 12:
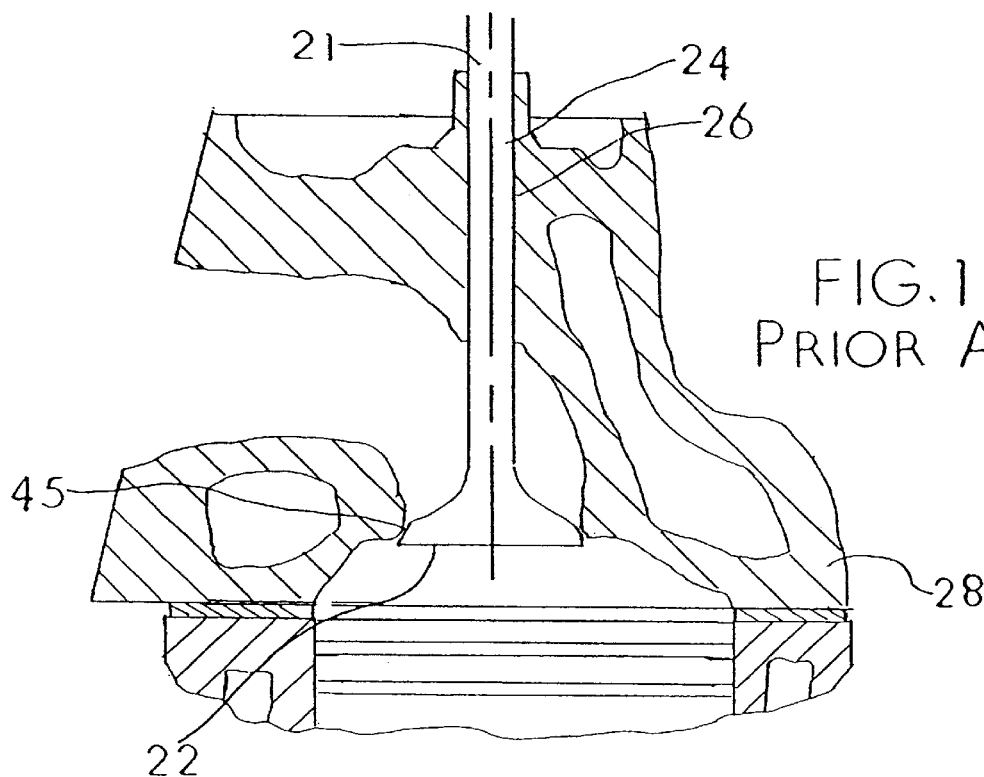
FIG. 12 is a partial, cross-sectional view of a prior art internal combustion engine showing the intake and exhaust valve of FIGS. 3 and 4.

FIG. 12 is the partial cross section view of an internal combustion engine to illustrate prior art or conventional valves. The valve 21 may be, for example, the valve of FIG. 3. The prior art valve 21 includes a valve head 22, formed as a body of revolution around an axis, and an upstanding valve stem 24 concentric to the axis of the valve head. Valve stem 24 is movably carried in a valve guide bore 26 formed in a cylinder head 28 coaxial with the axis of the valve seat 45.

Figure 13:
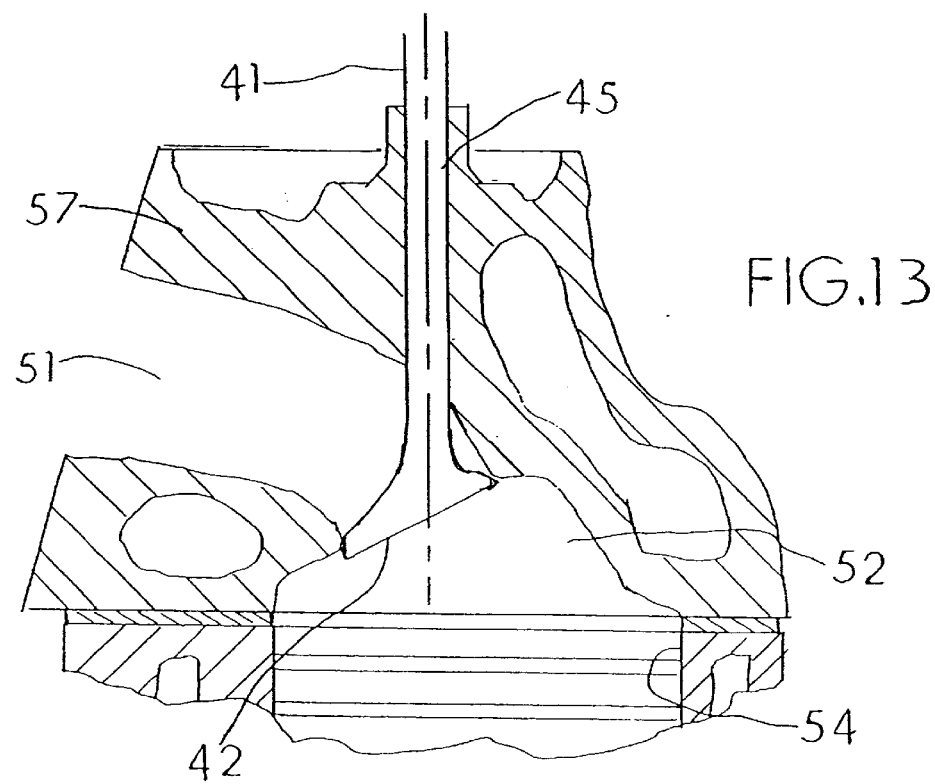
FIG. 13 is a partial, cross-sectional view of an internal combustion engine showing the intake and exhaust valve of FIG. 6.

FIG. 13 is a partial, cross-sectional view of an internal combustion engine depicting the valve 41 of FIG. 6. The valve 41 has a valve head 42 that is angled at, for example, about 20 to 30 degrees from the longitudinal axis 46 of the valve stem 24. The purpose is to allow for a port 51 having less severe angles into combustion chamber 52 than that of the prior art and a combustion chamber 52 shape that is more conducive to the production of swirl of an intake charge than that of the prior art, yet still allow for a valve stem 38 that is coaxial with cylinder bore 54 to enable engine designs that are more compact and have less weight. A more efficient and more compact shape cylinder head is provided by this embodiment of the present invention.

Figure 14:
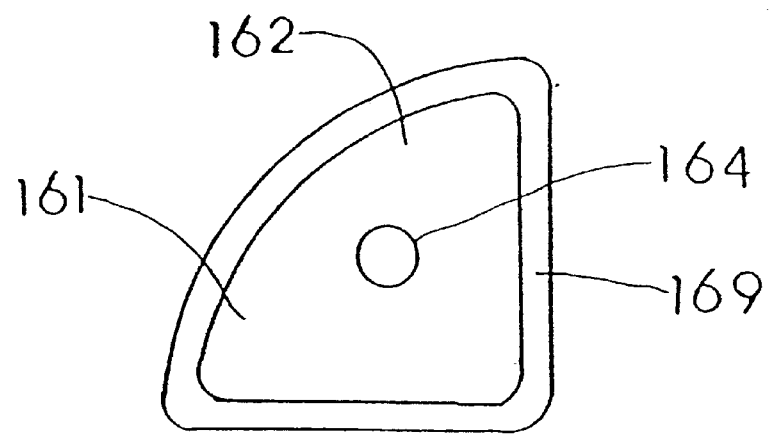
FIG. 14 is a top plan view of the an intake and exhaust valve showing an irregular pie-shaped valve head in accordance with another alternate embodiment of the present invention.

FIG. 14 is an illustration of yet another embodiment of an intake and exhaust valve 161. This pie-shaped valve 161 is shown looking down towards the back of the valve head 162 from above the valve stem 164 and shows an irregular shaped valve head 162. Also shown is angled valve seat surface 169 designed to mate with a corresponding shaped angular valve seat on a cylinder head (not shown). This shape valve head would work well with a combustion chamber with four valves, or where two valves are used one half of a combustion chamber.

Figure 15:
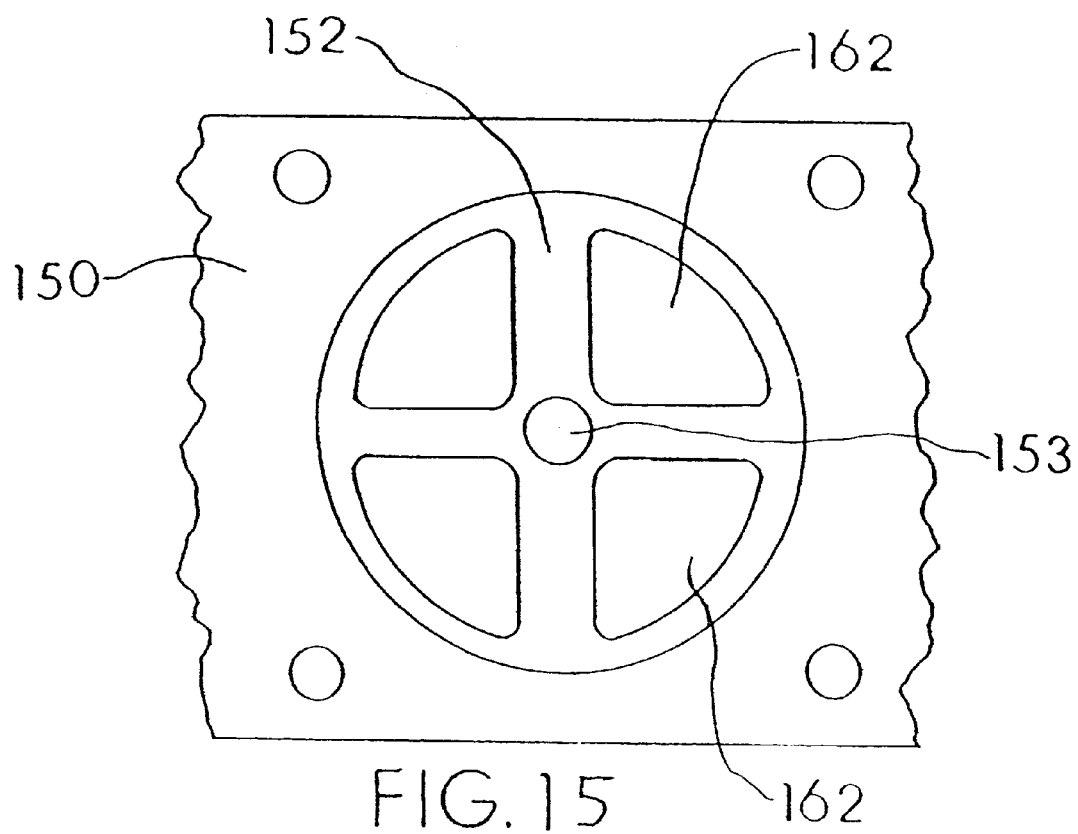
FIG. 15 is a top plan view of a partial cylinder head illustrating a combustion chamber and faces of the valve of FIG. 14.

Finally, FIG. 15 depicts a partial cylinder head 150 looking from top of piston towards a cylinder head 150 to show the irregular shaped valve head 162. Four valve heads 162 are shown in a combustion chamber 152 to illustrate the more efficient and effective use of available space in a combustion chamber 152 with four valves per cylinder. Also shown is a hole 153 for a spark plug or a fuel injector.

Although illustrated and described herein with reference to specific embodiments, the present invention nevertheless is not intended to be limited to the details shown. Rather, various modifications may be made in the details within the scope and range of equivalents of the claims without departing from the spirit of the invention.

What is claimed is:

1. In an intake and exhaust valve and valve guide for an internal combustion engine, said valve having a valve head for mating with a valve seat, said valve having a stem having a stem end and a head end, said stem sized to slidably move in said valve guide within said engine and said head for being moved between open and closed positions as said stem is moved in said guide, the improvement comprising a valve head having a stepped, non-planar shape with respect to the plane of the face of the valve head and an anti-rotation mechanism to prevent rotation of the said valve.

2. In an intake and exhaust valve and valve guide for an internal combustion engine, said valve having a valve head for mating with a valve seat, said valve having a stem having a stem end and a head end, said stem sized to slidably move in said valve guide within said engine and said head for being moved between open and closed positions as said stem is moved in said guide, the improvement comprising a valve head having a nonplanar shape with respect to the plane of the face of the valve head and an anti-rotation mechanism to prevent rotation of the said valve.

\* \* \* \* \*